Feb. 23, 1960 R. L. KOEHLER 2,926,344
MULTIPLE FREQUENCY SIGNALLING METHOD AND SYSTEM
Filed Aug. 13, 1956
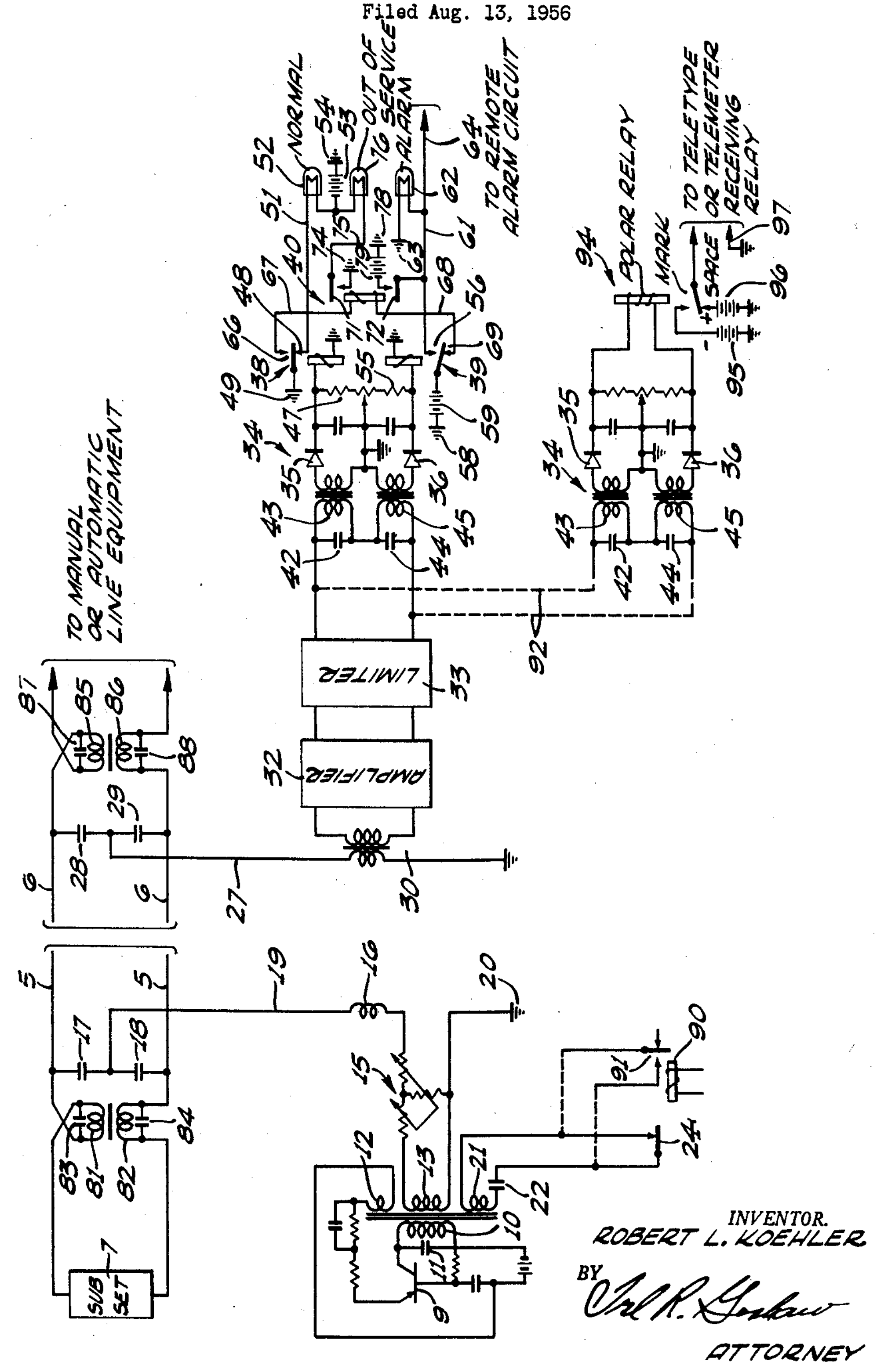
INVENTOR.
ROBERT L. KOEHLER
BY [signature]
ATTORNEY 2,926,344
Patented Feb. 23, 1960

2,926,344

MULTIPLE FREQUENCY SIGNALLING METHOD AND SYSTEM

Robert L. Koehler, Canoga Park, Calif., assignor to Koiled Kords, Incorporated, New Haven, Conn., a corporation of Connecticut Application August 13, 1956, Serial No. 603,699

3 Claims. (Cl. 340—253)

This invention relates to electrical signal transmission and particularly to the transmission of signals over telephone system transmission circuits for conveying intelligence, such as burglar alarms, fire alarms, Teletype and telemetering signals.

In my Patent No. 2,568,342, of September 18, 1951, a closed circuit type of signal transmitting method and system is disclosed and claimed. In this patented system, closed circuit operation was accomplished by transmitting a continuous signal tone in the absence of an alarm or in the normal state, and removing the signal tone to indicate the presence of an alarm. Such a system met all of the requirements for closed circuit type of operation and furnished a certain degree of reliability.

However, when such a closed circuit system uses a plurality of alarm circuits in the same telephone cable, certain problems arise. Since non-quadded exchange type cables are made up of hundreds of pairs which are designed primarily for the transmission of loop or circulating currents, no attempt is made to effectively transpose pairs longitudinally. As a consequence, longitudinal cross-talk coupling paths exist between pairs. The magnitude of this coupling between pairs is a function of the physical separation therebetween, their longitudinal balance, and the degree of longitudinal transposition that exists between the pairs. In general, the smaller the physical separation and the poorer the longitudinal transposition of the pairs with respect to each other, the greater the coupling between the exposed pairs; i.e., the easier it is to transfer energy from one pair to the other longitudinally.

This transfer of energy from one circuit to another is actually referred to as "cross-fire" rather than "cross-talk," which is common in message or voice circuits. This "cross-fire" results in a condition which reduces the ability of the signal receiver to recognize the removal of a tone, since an amount of residual tone energy exists from the "cross-fire" paths. The magnitude of this "cross-fire" energy is a function of many variables, but is primarily a function of a number of disturbing sources present, which, in this case, is the number of closed circuit alarms being operated in a given cable on the same frequency assignments. In addition to the above problem involving alarm applications, there are even greater limitations governing the number of high-speed coded signal systems, such as Teletype, certain telemetering and other data signals, which can be operated in the same cable on the same channel frequencies.

The present invention is directed to a system of and means for reducing the difficulties caused by "cross-fire" and also to provide an improved quality of signal transmission, particularly for high-speed applications.

The principal object of the invention, therefore, is to facilitate the transmission of characterized signals over existing cable transmission circuits.

Another object of the invention is to provide an improved method of and system for the transmission of a plurality of alarm signals in the same telephone cable.

A further object of the invention is to provide an improved alarm signalling system which utilizes different frequencies to prevent the signals in one telephone pair from interfering with the signals in other telephone pairs.

A still further object of the invention is to provide an improved transmitter and receiver of signals transmitted through telephone cables.

The novel features which are believed to be characteristic of this invention, both as to the manner of its organization and the mode of its operation, will be better understood from the following description when read in conjunction with the accompanying drawing, in which the single figure is a combination schematic and diagrammatic view of a transmission system embodying the invention.

Referring now to the drawing, conductors 5 and 6, separated by brackets to indicate different lengths, represent a circulating current transmission circuit between a subset 7 and a central office through which subset 7 may be connected to other subsets. As described in the above-mentioned patent, voice currents are transmitted as loop or circulating currents, while the signal currents are transmitted over lines 5 and 6 as longitudinal currents. The present invention is particularly applicable when the conductors 5 and 6 comprise one of many pairs within a telephone cable. Whereas, in the patented system, a single frequency is used, the present system utilizes a shift in signal frequency to distinguish between a signal "on" and a signal "off" condition. Such a system avoids "cross-fire" difficulties as well as increasing the speed of operation. Since the system employs limiting to provide clipping, response to noise and transient currents is prevented.

In the drawing, the signal transmitter is shown in the lower left hand corner and consists of an oscillator using a transistor 9, the frequency of oscillation of which is determined by a parallel resonant circuit consisting of a winding 10 shunted by a condenser 11 in the collector portion of the oscillator. In such an oscillator, oscillation takes place in much the same manner as that of a tuned plate oscillator using vacuum tubes, the generator feedback being provided by a winding 12.

The output of the oscillator is coupled to the transmission line 5—6 through a winding 13, an amplitude controlling network 15, a line coupling circuit consisting of an inductance 16 and condensers 17 and 18 in a conductor 19. The return circuit path is through ground 20. The frequency of the oscillator is shifted by means of a winding 21 connected in series with a condenser 22. For instance, when the contacts of a switch 24 in the circuit containing winding 21 and condenser 22 are open, a certain frequency $F_2$ is generated by the oscillator. When the contacts of switch 24 are closed, the capacitance of condenser 22 is reflected through winding 21 to the parallel resonant circuit 10—11 of the oscillator which effectively increases the capacitance of condenser 11 and thus decreases the frequency of oscillation of the oscillator to a frequency $F_1$.

Thus, two frequencies may be generated by the oscillator, a frequency $F_1$ when the contacts of switch 24 are closed and a higher frequency $F_2$ when the contacts of switch 24 are open. Normally, the contacts of switch 24 are closed and frequency $F_1$ is transmitted. When an alarm is to be transmitted, the contacts of switch 24 are opened, causing the oscillator to generate the higher frequency $F_2$. Thus, as the contacts of switch 24 open and close, two different frequencies will be generated and transmitted to the line 5—6. The pad 15 isolates the oscillator from the line 5—6 and, as mentioned above, provides a means for adjusting the level of the generated frequencies delivered to the line through the coupling circuit 16—17—18—19.

Referring now to the receiver portion of the system, the longitudinal currents are delivered to conductor 27 over condensers 28 and 29 and then impressed on an input transformer 30. The receiver includes an amplifier 32 and a limiter 33 and a frequency discriminator shown generally at 34, rectifiers 35 and 36, and relays shown generally at 38, 39, and 40. The amplifier's function is to increase the amplitude of the incoming signal to a value where limiting can be accomplished, the limitator maintaining a constant amplitude of the signal delivered to the discriminator 34 for wide variations in level received from the line 5—6.

The input to the discriminator includes two parallel resonant circuits in series consisting of condensers 42, winding 43, condenser 44, and winding 45, which are tuned, respectively, to somewhat higher and lower frequencies than the high and low signal frequencies generated. When the lower frequency $F_1$ is being received, the voltage across condenser 42 and winding 43 is considerably higher than across condenser 44 and winding 45. Conversely, when the higher frequency $F_2$ is being received, the reverse is true.

As an example, when frequency $F_1$ is being received, which is normal and no alarm is present, the incoming signal frequency $F_1$ is rectified by rectifier 35 providing a direct current in resistor 47 and the winding of relay 38 causing this relay to close its contacts 48. When contacts 48 are closed, a circuit is completed from ground 49 over closed contacts 48, a conductor 51, lamp 52 through battery 53 to ground 54. Thus, energized lamp 52 indicates a normal condition of the system.

Now, if the contacts of switch 24 are open and the higher frequency signal $F_2$ is being received, it is rectified by a rectifier 36 producing a direct current through resistor 55 and the winding of relay 39 which closes its contacts 56. Closing contacts 56 completes a circuit from ground 58 through battery 59, closed contacts 56, conductor 61, and lamp 62 to ground 63. Thus, the alarm lamp 62 is energized. Simultaneously, the battery 59 is connected to the conductor 64, which may be connected to a remote alarm equipment associated with the system.

With the shift from frequency $F_1$ to $F_2$, relay 38 is de-energized and releases to extinguish normal lamp 52. Thus, when the system is in normal operating condition, either relay 38 or relay 39 is energized, depending upon whether or not the contacts of switch 24 are open or closed. However, if a failure of either the transmitter or receiver occurs or both sides of the line 5—6 are opened, both relays 38 and 39 will be de-energized. When this occurs, a circuit is completed over ground 49, closed contacts 66, conductor 67, winding of relay 40, conductor 68, closed contacts 69, and battery 59 to ground 58. Relay 40 is thus energized and closes its two normally open contacts 71 and 72. The closing of contacts 71 completes a circuit from ground 74 over closed contacts 71, conductor 75, through lamp 76 and battery 53 to ground 54. The energization of lamp 76 will thus indicate an out-of-service condition of the signalling system.

The closing of contacts 72 of relay 40 completes a circuit from ground 78 through battery 79 over closed contacts 72, conductor 61, and through lamp 62 to ground 63. Thus, an alarm is also indicated by lamp 62, but with lamp 76 also energized, a warning is given that an out-of-service condition exists. Furthermore, battery 79 energizes line 64 since the relay 40 operates from an open line condition and there would thus be no way of determining whether the line was in trouble, had been cut intentionally, in the case of burglary, or burned open in the case of fire. Also, this feature provides a means of continuously testing the continuity of the system. That is, it will furnish an out-of-service indication when the transmitter line or receiver fails, which increases the reliability of the system.

A longitudinal band stop filter is used at each end of the transmission line. At the subset, this filter is composed of windings 81 and 82 connected in series opposing and condensers 83 and 84, which form parallel resonant circuits and consequently a high impedance path to the longitudinal signal currents $F_1$ and $F_2$ and negligible low impedance to the circulating voice currents. The same type of filter is shown at the other end of the line and is composed of windings 85 and 86 and condensers 87 and 88, this unit preventing the longitudinal transmission of signals through the central office.

Besides the above burglar and fire alarm applications, the system may also be used as a high-speed signal transmission channel such as required for Teletype and telemetering operations. To obtain high-speed frequency shifting, a relay 90 is operated to open and close its contacts 91 and may be substituted for the manual switch 24, as indicated by the dotted lines. At the receiving end, the dotted lines 92 indicate the substitution of the discriminator circuit 34 connected to a polar relay 94.

In the Teletype application, the low frequency $F_1$ will close the mark contacts of the polar relay connecting the negative end of a battery 95 to the Teletype or telemetering receiver relay. The higher frequency $F_2$ will close the space contacts connecting the positive end of a battery 96 to the Teletype or telemetering relay. Thus, as the contacts 91 are opened and closed, a negative or positive voltage will be transmitted to the receiving relay. The ground lead 97 is provided to permit looping the signal through a Teletype station or stations to operate over associated line relays.

This system will also transmit stepped voltage signals used in data systems provided condenser 22 is replaced with a data transmitter which varies the capacitance of condenser 22 in accordance with voltage amplitude, and the polar relay is replaced with a data receiver. Although a wider bandwidth is required in this application, the capabilities of the system permit this type of operation.

I claim:

1. A system for indicating the transmission of any one of a plurality of signals having different frequencies and the absence of the transmission of any of said signals comprising a generator of at least a pair of different frequency signals, means for shifting the generator from one of said signal frequencies to the other, a transmission line, means for impressing said signals on said line as longitudinal currents, means for individually detecting the transmission of a particular signal for indicating a normal condition of the system and an alarm condition, and means for detecting the absence of both of said signals for indicating an out-of-service condition and an alarm condition, said individual signal detecting means being a circuit having a portion tuned to each of said signals, a pair of means responsive to said signals, each of said pair of means being energized by the output of a respective portion of said circuit, a pair of indicators, one of said indicators being energized by the energization of its respective signal responsive means, a third signal responsive means connected to said pair of signal responsive means, said third signal responsive means being energized by the de-energization of said pair of signal responsive means, and a third indicator connected to said third signal responsive means.

2. A system for indicating the transmission of any one of a plurality of signals having different frequencies and the absence of the transmission of any of said signals comprising a generator of at least a pair of different frequency signals, means for shifting the generator from one of said signal frequencies to the other, a transmission line, means for impressing said signals on said line as longitudinal currents, means for individually detecting the transmission of a particular signal for indicating a normal condition of the system and an alarm condition, and means for detecting the absence of both of said signals for indicating an out-of-service condition and an alarm condition, said individual signal detecting means being a circuit having a portion tuned to each of said signals, a pair of relays, one of said relays being energized by the output of a respective portion of said circuit, and a pair of indicators, one of said indicators being energized by the energization of its respective relay, a third relay being connected to said signal indicating relays, said third relay being energized by the de-energization of said pair of relays, a third indicator being connected to said third relay.

3. A system in accordance with claim 2 in which each of said tuned circuit portions includes a rectifier, the energization of said third indicator being accompanied by the energization of one of said pair of indicators.

References Cited in the file of this patent

UNITED STATES PATENTS

| | | |
|---|---|---|
| 1,547,226 | Martin | July 28, 1925 |
| 2,137,349 | Rezos | Nov. 22, 1938 |
| 2,315,383 | Andrews | Mar. 30, 1943 |
| 2,443,125 | Weathers | June 8, 1948 |
| 2,510,139 | Purlington | June 6, 1950 |
| 2,554,329 | Hammond | May 22, 1951 |
| 2,558,888 | Trimble | July 3, 1951 |
| 2,604,518 | Oliver | July 22, 1952 |
| 2,611,031 | Appert | Sept. 16, 1952 |
| 2,729,703 | Faulkner et al. | Jan. 3, 1956 |
| 2,817,025 | Adler | Dec.17, 1957 |